Sept. 16, 1969  E. F. HILL ETAL  3,467,120
BURST DISK ARRANGEMENT
Filed April 13, 1967
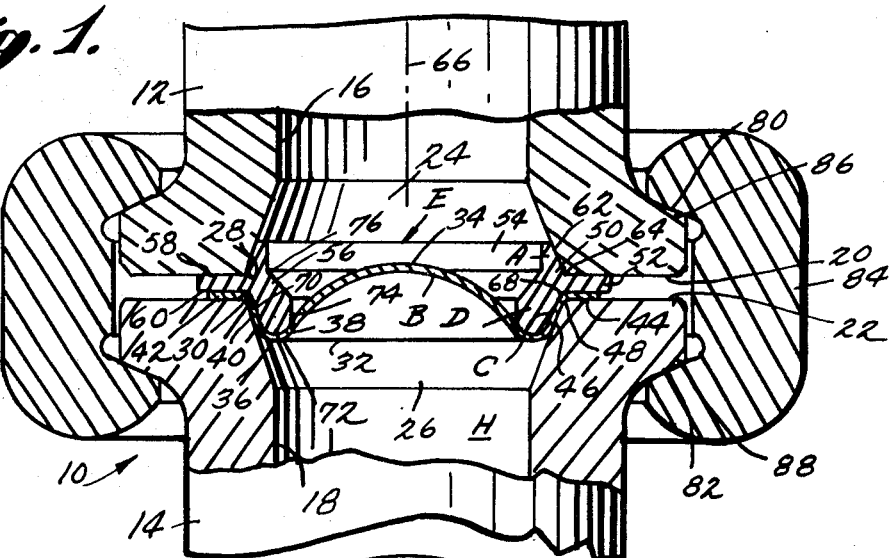
Fig. 1.
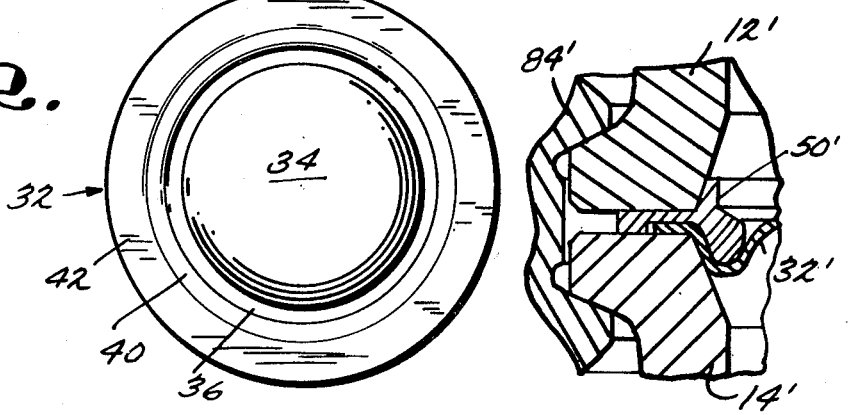
Fig. 2.
Fig. 1a.
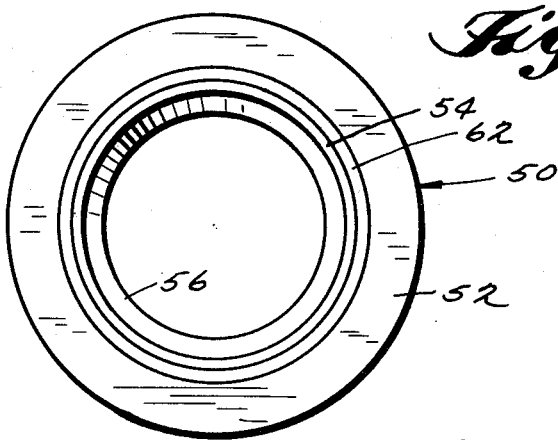
Fig. 3.
INVENTORS
ERWIN F. HILL
BY RAYMOND E. LATHAM
Cushman, Darby & Cushman
ATTORNEYS

United States Patent Office 3,467,120
Patented Sept. 16, 1969

3,467,120
BURST DISK ARRANGEMENT
Erwin F. Hill and Raymond E. Latham, Houston, Tex.,
assignors to Gray Tool Company, Houston, Tex., a corporation of Texas
Filed Apr. 13, 1967, Ser. No. 630,645
Int. Cl. F16k 13/04; B65d 25/08
U.S. Cl. 137—68                                5 Claims

ABSTRACT OF THE DISCLOSURE

For use in a pressure system having two conduits that meet one another at standard ends having internal frustoconical annular sealing surfaces, a burst disk having an annular peripheral portion seated against the end of one conduit and bellied toward the bore of the other conduit; and an annular sealing ring having one flexible sealing lip stressed into resilient sealing engagement with the sealing surface of the other conduit and an annular bulbous portion sealingly urging the burst disk, near the periphery thereof, against the one conduit annular sealing surface.

BACKGROUND OF THE INVENTION

Burst disks or rupture disks are commonly used in pressure systems in order to protect equipment and personnel against sudden overpressures within the pressure system. Such burst disks are designed so that during normal operation of the pressure system, the burst disk remains inactive. However, when an overpressure builds up to a predetermined extent within the system, the burst disk ruptures causing relief of the pressure to safe operating limits. Burst disks are conventionally held between the halves of special safety head fittings. Accordingly, in order to incorporate a prior art rupture disk or burst disk in a pressure system, it is first necessary to install special fittings on the adjacent ends of the pressure vessel or conduit parts. It can be appreciated that installation of such fittings involves a considerable expense both because of the necessity for such special fittings and the labor needed to install them, and also due to the relative inaccessibility of many pressure system locations where burst disks should be installed.

In some pressure systems, especially those used in research applications, system changes are made from time to time so that whereas the pressure within the system upstream of a burst disk may have been greater than that downstream of the disk for a certain run or experiments, the reverse may be necessary for a later run of experiments. With prior art burst disk arrangements using special safety head fittings, such reversal necessitated the removal of the fittings first used and their replacement with other fittings or a time-consuming disconnection of the special fittings from the pressure system and their reversal and reconnection to the adjacent pressure vessel parts.

SUMMARY OF THE INVENTION

With the burst disk arrangement according to the principles of the present invention, a special sealing ring and disk are provided which can be placed at any point in a pressure system without changing the end connections already in place on the pressure system. For instance, in a pressure system which includes two conduits in axial alignment having end surfaces presented toward one another and sealed with a sealing ring and clamp such as are shown in FIGURE 2 of the U.S. Patent to Watts et al., 2,766,999, the ring 10 of that patent may be removed and replaced by the novel seal ring and rupture disk combination as disclosed herein, without modification being necessary upon the conduits or the sealing surfaces thereof. Because of the ability of the arrangement of the present invention to be incorporated between standard conduit ends, it is possible to simply reverse the disk of the arrangement when pressure is to be applied from the opposite direction within the pressure system. No modification to, or changing of the conduit ends is necessary when using the arrangement according to the present invention.

Furthermore, the arrangement according to the present invention allows burst disks of varying composition and diverse central configuration to be employed, as well as diverse means such as expansible clamps, flanges, threads, bayonet joints or the like as holding means to maintain the integrity of the joint.

The burst disk arrangement of the present invention is not limited to being incorporated between two conduits, but may be incorporated between any fluid confining parts of a pressure system such as between a cover and a conduit, between two halves of a pressure vessel shell or between a conduit and an annular end flange.

The principles and scope of applicability of the present invention may be best understood with reference to the accompanying drawings wherein an illustrative embodiment is shown and to the following description.

BRIEF DESCRIPTION OF THE DRAWING

FIGURE 1 is a longitudinal sectional view through a joint provided with a burst disk arrangement according to the principles of the present invention;

FIGURE 1a is a fragmentary sectional view, similar to FIGURE 1, showing a modification;

FIGURE 2 is a top plan view of the burst disk of FIGURE 1; and

FIGURE 3 is a top plan view of the sealing ring of FIGURE 1.

DESCRIPTION OF THE PREFERRED EMBODIMENT

In FIGURE 1 a burst disk arrangement according to the present invention is shown incorporated in a conduit connection at 10. The connection includes first and second tubular conduits 12, 14 having their respective throughbores 16, 18 in longitudinal alignment and their respective one end surfaces 20, 22 presented toward one another. The bore 16, 18 of each conduit 12, 14 is provided with a radially, inwardly, facing frustoconical sealing surface 24, 26 adjacent and leading to the respective end surface 20, 22 thereof. The sealing surfaces 24, 26 are of the type shown at 32 in the above-mentioned patent of Watts et al. The surfaces 24, 26 as shown in FIGURE 1 are of equal taper, size and extent; they enlarge in diameter towards the respective end surfaces 20, 22. The sealing surfaces 24, 26 meet the respective conduit end surfaces 20, 22 at circular apices 28, 30 which are of equal diameter.

The burst disk 32 is generally circular as seen in plan (FIGURE 2). A circular central portion thereof 34, generally corresponding in diameter to the diameter of the bores 16, 18, is generally roundly bulged away from the high pressure side H of the system toward the bore of the other conduit part. The disk 32 is preferably formed from a metal sheet, the particular metal being dependent upon the pressure and environmental conditions to which the disk is to be subjected. Typical materials are stainless steel, nickel, nickel alloys, noble metals, aluminum, aluminum alloys, and the like. Where corrosive conditions may be encountered or where the metal of the disk could be expected to contaminate or inhibit a delicate process, one or both sides of the disk 32 may be coated with a protective or isolating coating or barrier layer such as polytetrafluoroethylene, polychlorotrifluoroethylene or a deposited coating of another metal such as lead, gold, copper, platinum or the like.

As is well known in the pressure disk art, burst disks such as the disk 32 may be constructed so that they will rupture at attainment of a preselected pressure. Predetermination of the rupture point is provided by judicious choice of material for fabrication of the disk both as to composition, thickness and history of working. In addition, relatively thick disks can be provided with prescoring so as to lower the rupture pressure and predetermine the burst configuration of the disk.

The disk 32 at the radially outer extent of the prebulged portion 34 is annularly convex in a sense opposite that of the prebulged portion 34. The annular convex portion 36 merges smoothly at its radially inner extent into the prebulged portion 34 at a transition point 38. At its radially outer extent, the portion 36 smoothly merges into a frustconically curved annular band 40. The band 40 enlarges in diameter as it proceeds in the same sense as that of the bulging of the portion 34 of the disk 32. At the radially outer extent thereof the frustoconically curved annular band 40 smoothly merges into an essentially radially directed annular flange 42 at the radially inner extent of the flange 42. As oriented, in the connection 10, the lower surface 44 of the flange 42 is adjacent (for instance 0–0.005 inch from) the end surface 22 of the conduit 14 adjacent and leading to the apex 30. Likewise, the exterior surface 46 of the frustoconically curved annular band 40 is in surface to surface engagement with the frustoconical sealing surfaces 26 of the conduit 14 adjacent and leading to the apex 30. It is important to note that the surfaces 44 and 46 meet one another at a circular line 48 having a diameter substantially equal to that of the apex 30. In practice, as shown in FIGURE 1, both the apex 30 and juncture 48 should be slightly rounded or filleted complementarily in order to prevent undue galling or extrusion.

The sealing ring 50 as shown in FIGURES 1 and 3 is an annular member composed of elastic hard metal or the like. Typical of materials for fabrication of the ring 50 are carbon steel and stainless steel. Protective or isolating coatings or barriers similar to those discussed above as useful with the burst disk 32 may be used on the ring 50.

As shown, the ring 50 includes an integral, central, radially, outwardly directed flange or rib 52, an inner axially, elastically deflectable annular flange 54 projecting in one axial sense from the inner extent of the rib 52 and a massive, bulbous annular section 56 extending in an axially opposite sense from the inner extent of the rib 52. The ring 50 is provided with flat oppositely axially directed side surfaces 58, 60 on the rib 52 thereof.

The elastically deflectable annular lip 54 is provided with an exterior, frustoconically curved annular sealing surface 62. The surface 62 decreases in diameter as it proceeds axially away from the surface 58 of the rib 52. When the ring 50 is in an unstressed condition, the circular line 64 formed at the juncture of the sealing surface 62 and the rib side surface 58 has a diameter substantially equal to that of the apex 28 of the conduit part 12, however, in the unstressed condition, surface 62 is more steeply tapered with respect to the longitudinal axis 66 of the parts 12, 14, 32, 50, than the surface 24 on the conduit part 12. The angular difference is not great being on the order of 1–3 degrees or so. The ring bulbous section 56 exteriorly thereof meets the rib 52, surface 60 smoothly at a fillet 68 which is adjacent and generally complementary to the filleted apex 30 of the conduit part 14, but for the interposition of the disk 32 at 48. From 68, the bulbous portion 56 proceeds with a frustoconical surface 70 which is presented generally radially outwardly, then smoothly into an axially presented convex surface 72. The surfaces 70 and 72 of the bulbous portion 56 are configured and positioned to co-extensively engage and back up the opposite face of the disk 32 from the portions 46 and 36 thereof, respectively. At the radially inner extent of the surface 72, the bulbous portion 56 is relieved beginning at 74 and terminating at 76 so as to be free of the bulged portion 34 of the disk 32 in these regions.

When the connection 10 is to be made up, the burst disk 32 is placed as shown in FIGURE 1, so that its outer peripheral radially extending flange overlies the surface 22. The sealing ring 50 is placed upon the burst disk 32 as shown in FIGURE 1 and the conduit 12 brought axially toward the conduit 14. The means for bringing the conduits 14 and 12 axially toward one another may conveniently comprise outer peripheral wedging surfaces 80 and 82 on the conduits 12, 14 adjacent the respective end surfaces 20, 22 thereof and a radially expansible and contractile segmental clamp 84 having corresponding wedging surfaces 86, 88 for wedging engagement with the conduit surfaces 80, 82. A suitable clamp for this purpose is shown at 38 in FIGURES 2 and 5 of the abovementioned patent of Watts et al. However, the burst disk arrangement of the present invention is not limited to use with diverse means for drawing conduits axially together and holding them in axially aligned connected relationship, for instance as shown in FIGURES 7, 8 and 9 of the above-mentioned patent to Watts et al.

With the connection 10 assembled as shown in FIGURE 1, a stored energy flexing lip seal is provided at A; compressive loading against the disk B effects a seal at C; the heavy section D of the ring E will not allow distortion or unseating at C.

Should it be desired, to have the high pressure portion of the system above the disk 32 in the orientation of FIGURE 1, it is only necessary to expand the clamp 84, invert the ring 50 and disk 32 as a unit, and contract the clamp 84 once more. A large saving of time and expense is thus made because there is no necessity to change the conduit ends as is necessary with prior art devices.

In instances where the disk 32 is made of tough elastic metal such as steel, a positive limitation on further drawing of the conduit parts 12, 14, axially toward one another through tightening of the clamp 84 is provided by abutment of one of the rib 52 sides with one conduit end, abutment of one surface of the disc portion 44 with the other conduit end and abutment of the other rib 52 side with the other side of the disc portion 44. This abutment also limits deflection of the ring lip 54 to within the elastic limits thereof to provide a stressed surface to surface seal at 62, 24. In instances where the disc 32 is made of somewhat softer material, an axially extending annular bead can be formed at the outer periphery of the surface 60 on the rib 52 of an axial extent slightly less than the thickness of the portion 44 of the ring 32. Such a modified ring provides a positive stop as the one side and bead of the ring abut opposite end surfaces 20, 22 of the conduit parts 12, 14 as the latter are drawn axially toward one another, while providing adequate gripping of the disc peripherally thereof between the rib 52 and one conduit part surface. The ring bulbous portion frustoconically curved surface and said other part frustoconically curved annular sealing surface preferably differ in diameter at each diametrically coextensive point by an amount slightly less than twice the unstressed radial thickness of the burst disk intermediate annular bulged portion throughout the extent of the exterior frustoconically curved surface thereof. The modified ring is illustrated in FIGURE 1a, being provided with primed numerals.

It should now be apparent that the present invention efficiently provides a burst disc arrangement which can be placed at any point in a pressure system without changing the standard end connections of the pressure system and which can be easily accommodated to an inversion of the pressurization within the pressure system.

We claim:
1. In a fluid pressure system, a burst disk arrangement constructed and arranged to be received between standard internal frustoconically curved sealing surface provided conduit ends, comprising: a burst disk having a central portion roundly bulged in a first axial sense, an integral, intermediate annular portion bulged in the opposite axial sense and an outer, annular radially directed portion; and an integral annular sealing ring of elastic hard metal or the like having an annular elastically deflectable lip extending axially in said first axial sense and constructed and arranged to be deflected by and resiliently seal with one conduit end sealing surface and an integral bulbous annular portion axially directed in said opposite axial sense; said bulbous annular portion engaging and backing up the intermediate annular bulged portion of said burst disk.

2. In a fluid pressure system; the combination including two fluid confining parts having end surfaces presented toward one another; means defining an inwardly facing frustoconically curved sealing surface in each part adjacent, leading to and enlarging in diameter toward the respective part end surface; connection means associated with said parts and constructed and arranged to draw said parts axially toward one another and maintain the parts so drawn in axial alignment; a burst disk having a central portion roundly bulged toward one part an integral intermediate annular portion bulged toward the other part and an integral outer annular radially extending portion; said annular bulged portion including an exterior generally frustoconically curved surface enlarging in diameter toward said outer annular radially extending portion; said annular bulged portion seating against said other part frustoconically curved sealing surface and said outer annular radially extending portion seating on said other part end surface peripherally of said other part frustoconically curved annular sealing surface; and an annular sealing ring of elastic hard metal or the like; said sealing ring having an annular, generally axially directed elastically deflectable lip provided with means defining an exterior, frustoconically curved annular sealing surface enlarging in diameter toward the imaginary diametric centerline plane of the sealing ring, said sealing ring sealing surface normally being tapered at a more acute angle to the longitudinal axes of said parts than the said frustoconically curved sealing surfaces of said parts; said ring also having an integral bulbous annular portion directed axially oppositely from said lip; said lip sealing surface being in resilient stressed surface to surface sealing engagement with the frustoconical sealing surface of said one part and said ring bulbous annular portion coextensively backing up the intermediate annular bulged portion of said burst disk and forcing the intermediate annular bulged portion exterior generally frustoconically curved surface into sealing engagement with the frustoconically curved annular sealing surface of said other part.

3. The fluid pressure system of claim 2 wherein the two part frustoconically curved annular sealing surfaces are of equal diameters at all corresponding points on both from the respective end surfaces thereof whereby said sealing ring and burst disk are invertible.

4. The fluid pressure system of claim 2 wherein the sealing ring further comprises an integral central, radially outwardly extending rib having means defining opposite axially presented side faces, and wherein drawing of said parts axially toward one another is limited by abutment of one side face with said one part end surface, abutment of the other side face with said burst disk outer annular radially extending portion, and abutment of the burst disk outer annular radially extending portion with said other part end surface.

5. The fluid pressure system of claim 2 wherein the ring bulbous portion frustoconically curved surface and said other part frustoconically curved annular sealing surface differ in diameter at each diametrically coextensive point by an amount slightly less than twice the unstressed radial thickness of the burst disk intermediate annular bulged portion throughout the extent of the exterior frustoconically curved surface thereof.

References Cited
UNITED STATES PATENTS

| | | |
|---|---|---|
| 2,387,353 | 10/1945 | Raymond. |
| 2,766,999 | 10/1956 | Watts et al. _____ 285—334.2 |
| 2,980,286 | 4/1961 | Coffman. |
| 3,044,479 | 7/1962 | Meyer et al. _____ 137—68 |
| 3,196,610 | 7/1965 | Anderson _____ 137—68 XR |
| 3,207,184 | 9/1965 | Lambert _____ 138—89 |

ROBERT R. MACKEY, Primary Examiner

U.S. Cl. X.R.

138—89; 285—3; 220—89